(12) United States Patent
Hind et al.

(10) Patent No.: US 7,206,791 B2
(45) Date of Patent: Apr. 17, 2007

(54) SYSTEM AND METHOD FOR MANAGING AND SECURING META DATA

(75) Inventors: John R. Hind, Raleigh, NC (US); Marcia L. Stockton, Bakersfield, CA (US)

(73) Assignee: International Business Machines Corporation, Armonk, NY (US)

( * ) Notice: Subject to any disclaimer, the term of this patent is extended or adjusted under 35 U.S.C. 154(b) by 597 days.

(21) Appl. No.: 10/051,558

(22) Filed: Jan. 17, 2002

(65) Prior Publication Data

US 2003/0135765 A1     Jul. 17, 2003

(51) Int. Cl.
*G06F 17/30* (2006.01)
(52) U.S. Cl. ........................ 707/104.1; 707/1
(58) Field of Classification Search ............ 707/1–10, 707/100–104.1, 200–201; 705/27; 713/201, 713/53, 155; 702/181; 715/507, 744
See application file for complete search history.

(56) References Cited

U.S. PATENT DOCUMENTS

| | | | |
|---|---|---|---|
| 6,014,638 A * | 1/2000 | Burge et al. | 705/27 |
| 6,460,141 B1 * | 10/2002 | Olden | 713/201 |
| 6,490,679 B1 * | 12/2002 | Tumblin et al. | 713/155 |
| 6,539,375 B2 * | 3/2003 | Kawasaki | 707/5 |
| 6,564,170 B2 * | 5/2003 | Halabieh | 702/181 |
| 6,651,217 B1 * | 11/2003 | Kennedy et al. | 715/507 |
| 6,957,390 B2 * | 10/2005 | Tamir et al. | 715/744 |

* cited by examiner

*Primary Examiner*—Yicun Wu

(57) ABSTRACT

A method and system for managing meta data for a computing device are disclosed. The method includes collecting meta data resulting from use of the computing device, the meta data including application data usable in an application and context data for identifying context in which the application data are used. The method further includes determining statistical information associated with the collected meta data, wherein the statistical information indicates relationships between the collected meta data, storing the collected meta data and the statistical information in a storage of the computing device, and retrieving, from the storage, application data that would be most appropriate for a current context of using the application based on the context data and the statistical information.

64 Claims, 7 Drawing Sheets

SYSTEM AND METHOD FOR MANAGING AND SECURING META DATA

RELATED APPLICATION

The present application is related to a co-pending U.S. application Ser. No. 10/051,951, filed concurrently herewith on Jan. 17, 2002, entitled "System and Method for Managing and Securing Meta Data Using Central Repository", and assigned to the assignee of the present invention.

BACKGROUND OF THE INVENTION

1. Field of the Invention

The present invention relates to data management systems and, more particularly, to a system and method for managing and securing meta data.

2. Discussion of the Related Art

Meta data is known as any data that relates to or describes some other data. Examples of meta data can include, but are not limited to, web page setting parameters (e.g., font, font size, background color, window size, etc.), user IDs and passwords, and values entered into the data fields of computer forms such as online order forms. Conventional Web browsers such as Microsoft Internet Explorer offer limited meta data management features. For example, an "auto-complete" function offered by Microsoft Internet Explorer manages meta data such as Web addresses, passwords, and contact information that the user enters into the data fields of computer forms. Subsequently, when the user begins to enter a value into a particular data field of a computer form previously processed by the user's browser, the auto-complete function provides a drop-down list suggesting possible values for that data field. The user's selection of one of the suggested values triggers the browser to automatically fill in the data field with the selected value.

One popular feature of the auto-complete function is the "password-assist" feature for assisting the user in filling in passwords and user IDs. For instance, when the user enters a user ID and a password into the appropriate data fields of a computer form for the first time, the auto-complete function of the Web browser stores the user ID and password in association with the data fields identified by particular field names. The user ID and password are typically stored in an encrypted format in a local repository such as the memory of the user's PC. Then, each time the same data fields appear on the user's screen, the auto-complete function retrieves the corresponding user ID and password and decrypts them. Then the auto-complete function automatically fills in the data fields with the decrypted user ID and password. Typically, the password in the "password" field of the form is obfuscated by being displayed as a string of asterisks.

Although such conventional meta data management systems are intended to be beneficial, there are problems or limitations that are associated with the conventional systems. First, in conventional Web browsers, all web pages are displayed using the same web page settings regardless of time, website, user role indicating different roles of a user (e.g., an IBM employee, a private person, or a club representative), and other variables. But, one or more users of the computer may prefer different display settings depending on the website, user role, etc. For example, the user may prefer to always view a particular website in medium font size and dark background color on the user's computer, whereas the same user may prefer to view a different website in extra large font size and bright background color on the same computer. In the conventional systems, if the user desires to view a particular page in different display settings (e.g., with larger font size), then the user must manually change the display settings, at which time, all subsequent web pages will be displayed according to the newly set display settings. Thus, the conventional Web browsers require the user to manually change the web page settings at each desired instance. This can be tedious and time consuming to the user, and negatively affects the Web browsing experience of the user.

Another problem not addressed by conventional meta data management systems is that the conventional systems are not configured to recognize different meta data associated with different roles of a user. For instance, the user may function as an IBM employee, an association representative, or a private citizen (personal use) when ordering products online from a particular online vendor. Depending on the user role, the user utilizes different meta data such as different user ID/and password, mailing address, payment information, etc. However, regardless of the current user role, the conventional Web browsers always supply the last used meta data when filling out forms, which is often inappropriate for the current user role.

Another problem with conventional systems is that the conventional system does not recognize relationships between data fields of forms and pages so that the field values are often used out of context. For instance, an online order form may request a home address comprising four related data fields, namely, street name, city, state and zip code. Although these data fields are related, the conventional system stores values for each of these fields individually and does not store relational information on these fields. Thus, when the conventional Web browser provides a drop-down list identifying suggested values for a particular data field, the drop-down list often includes certain items that are completely irrelevant for the particular data field. Moreover, since the conventional Web browser is unable to recognize related data fields, a large number of items are often displayed in one drop-down list. As the number of items displayed in the drop-down list increases, it becomes more difficult for the user to view the list and find quickly the appropriate value from the list.

Another problem with the conventional systems is that the drop-down list is displayed for one data field at a time and triggered in response to the user's manual input of some value into the data field. This means that the user must type in the value to see the appropriate drop-down list and needs to repeat this process for each and every data field in the form. Thus, the conventional form filling process can be inconvenient and time consuming to the user.

Yet another problem with the conventional systems is the "password-assist" feature offered by the auto-complete function of the system. Although the "password-assist" feature provides some benefits to the user because the user does not need to remember multiple user IDs and passwords, this feature can have the unpleasant side effect of helping the user forget her user IDs and passwords since the browser automatically fills the user ID/password fields in most cases. Further, when a password requesting form has a field name which is different from the stored field name associated with the password, the auto-complete function fails to recognize this field and the user will need to manually enter the password into the field. Furthermore, when a password changing form includes a field for entering the old password, which often has a field name unrecognized by the browser, the auto-complete function will not supply the old password and the user will need to enter it manually. But, since the user is so used to the browser automatically filling in the passwords, the user typically fails to recall the appropriate password, which places the user in problematic situations.

In addition to the above-described problems associated with conventional meta data management systems, there are other needs that are unmet by the conventional systems. For example, it would be desirable to have some means by which a user can inspect, edit and/or organize stored meta data both online and offline. It would also be desirable to have some means to intelligently search for certain meta data from a pool of stored meta data, and to be able to select certain meta data for insertion into forms. It would also be desirable to enable a user to customize a number of different display settings for each different website, page, file, and/or user role and to provide some means that implements such display settings appropriately depending on the requested website, page, file and/or user role.

SUMMARY OF THE INVENTION

The present invention provides a system and method for managing and securing meta data which overcomes problems associated with conventional data management systems and which satisfy the above-described needs of the conventional systems. Particularly, the system of the present invention implements an innovative and sophisticated approach for assisting the user with application-based activities such as filling in a computer form, word-processing a file, requesting a website, changing a password online, etc. The present approach involves collecting meta data, which are generated by the user while using the applications, in association with the context in which such meta data are generated, and heuristically exploiting the use of the stored meta data to assist the user with any future application-based activities, thereby enhancing greatly the current experience of the user in conducting application-based activities without the limitations of conventional approaches.

The system of the present invention is implementable in a user's computing device such as a computer, work station, PDA, etc. More specifically, the user's computing device is configured to interact with any application (e.g., Web browser, word processor, graphics program, etc.) that the user is currently running on the user's computing device. The computing device collects meta data resulting from the user's use of the application, and stores them in database(s) of the user's computing device. The meta data include "application data" and "context data". Application data is any data that is directly used in the applications. Examples of application data may include: 1) user preference data such as display setting data (e.g., font, font size, window size, background color, etc.) that are set by the user for displaying specific web pages or files, 2) form data, i.e., values that the user enters into the fields of computer forms, 3) user ID/password combinations, and 4) PKI certificates/private key pairs used by the user's computing device to provide secured communications. The context data identifies the context in which the application data are used. Examples of the context data may be URIs (uniform resource identifiers) of forms, file names, user roles (role of the user associated with the application data), form names, or any other property that identifies the context in which the application data are used. For instance, when the user fills out a computer form, all the values that the user entered into the fields of that computer form would be stored as application data whereas the URI of the computer form, the user role (i.e., role in which the user functioned to fill the computer form), computer form name, or the like would be collected as context data for the collected application data.

All the meta data that are related to each other or used together in a particular context are stored together in the user's computing device. This permits the system to recognize and consider relationships between the meta data when accessing the stored meta data. In addition, the system maintains statistical information indicating relationships between the meta data. In one embodiment, the statistical information indicates how frequently certain application data are used together in a particular context.

The system performs sophisticated search and retrieval operations on the database(s) to utilize the stored application data to perform automatically certain tasks for the user. Since the meta data and the statistical information represent the user's past behaviors in using the applications, whether it be filling out a computer form, displaying a web page or file, etc., the system relies on this prior use information to anticipate the likely behavior of the user during a current use of the application, and retrieves stored application data that would be most appropriate for the current context of using the application. This process is implemented using existing heuristics algorithms to find optimal solution(s) that satisfy multiple search requirements. In one embodiment, the search requirements are formulated based on different properties (e.g., URI, user role, etc.) that identify the current context of using the application. These different context properties are assigned to different weights (representing different degrees of importance) to find solution(s) that would be most appropriate for the current context. The identified solution(s) will represent application data that the user will likely use in the current context of using the application. Then the system applies automatically the identified solution(s) in the user's current context of using the application.

As an example, specific display settings set by the user for different web pages are stored in association with their contexts. Subsequently, when a particular web page is to be displayed to the user, the system searches the database(s) based on the current context information (e.g., URI of the particular web page and/or the current use role), and heuristically retrieves page display setting data that the user would most likely select to display this particular web page. The retrieved display setting data are then automatically applied in the current context of displaying the web page, so that the particular web page is displayed according to the retrieved display setting data. In this manner, different web pages will be displayed automatically in different settings that are preferred or likely preferred by the user.

The present system also provides a meta data editor that allows the user to organize, sort and edit the meta data stored in the database using a graphical user interface. Using the editor, the user can select, from multiple possible values, most appropriate values to be inserted into a form on demand by using an existing selection technique such as a drag-and-drop editing operation.

Accordingly, the present invention intelligently provides suggestions or implements changes to the current context of using an application in a manner that the user would likely have chosen. Thus, the user need not manually effectuate such changes for each different instance of using the application, whether it be filling out a computer form, changing the display setting of a page/file, changing a password, etc. Due to this automation and customization, the present invention improves greatly the user's experience of utilizing the applications.

DETAILED DESCRIPTION OF THE PREFERRED EMBODIMENTS

Figure 1:
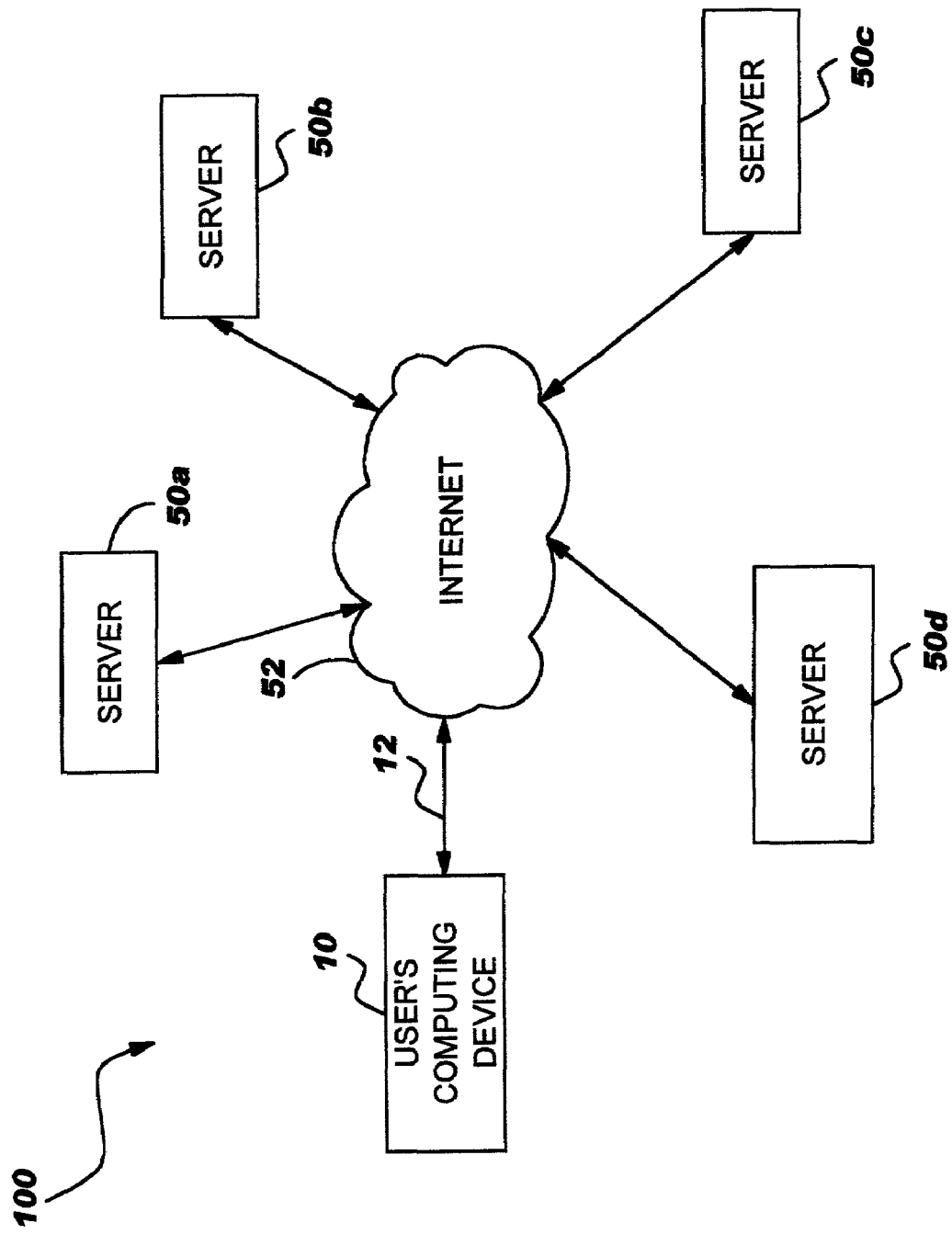
FIG. 1 is a diagram of a system for managing and securing meta data according to one embodiment of the present invention.

In the drawings, the same reference numerals are used to indicate the same elements.

FIG. 1 is a diagram of a system 100 for managing and securing meta data according to one embodiment of the present invention. As shown in FIG. 1, the system 100 includes a user's computing device 10 capable of communicating with a plurality of different servers 50a, 50b, 50c and 50d through a communications network such as the Internet 52. The servers 50a–50d are conventional servers or other means for providing and maintaining websites. The user's computing device 10 can be, for example, a computer, a work station, a PDA (Personal Digital Assistant), a mobile telephone, or any other communication device capable of carrying out functions discussed below.

Figure 2:
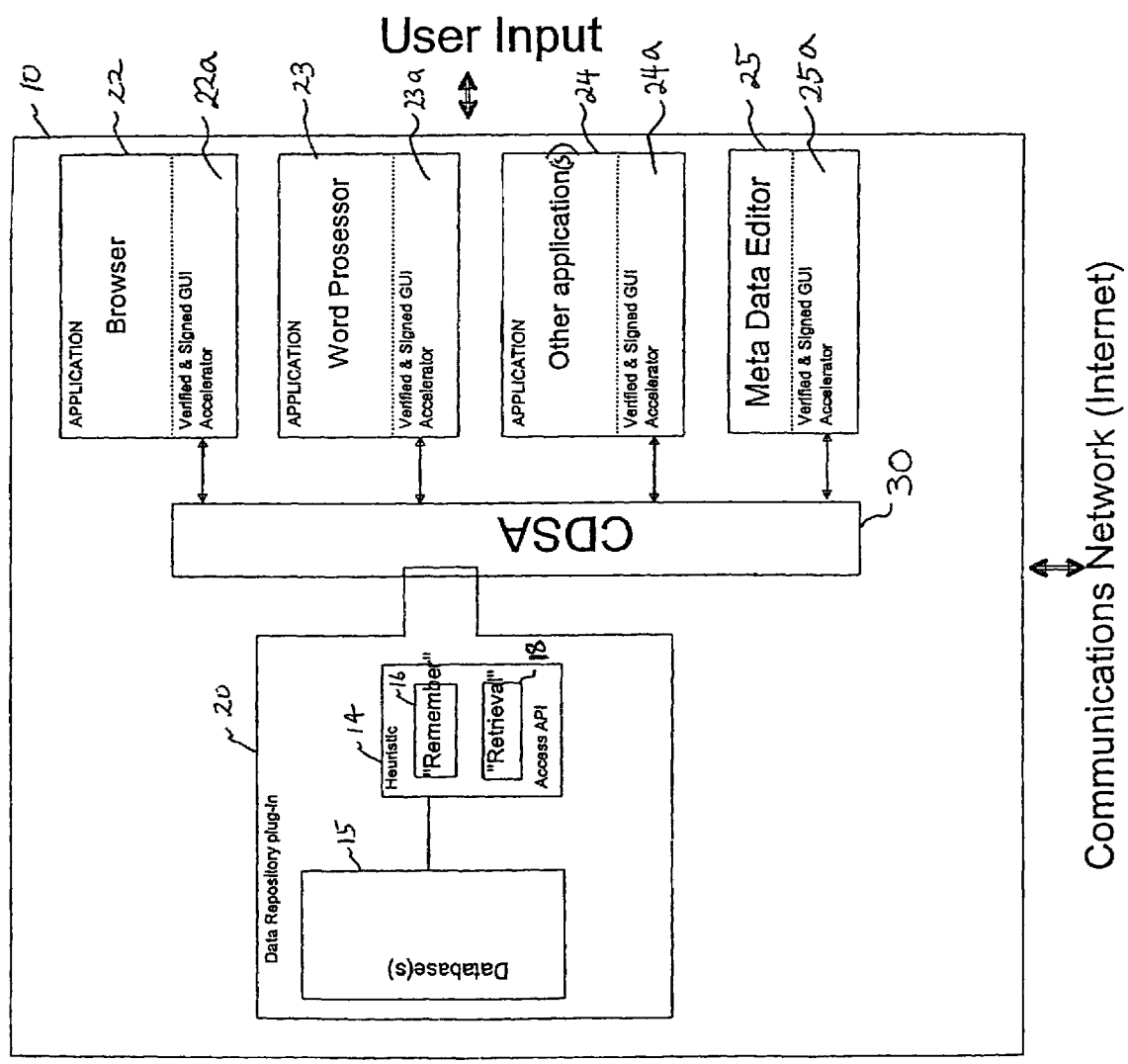
FIG. 2 is a block diagram of a user's computing device in the system shown in FIG. 1 according to one embodiment of the present invention.

FIG. 2 is a block diagram of the user's computing device 10 in the system 100 of FIG. 1 according to one embodiment of the present invention. As shown in FIG. 2, the user's computing device 10 includes Common Data Security Architecture (CDSA) 30, a data repository plug-in 20, a plurality of applications including a Web browser 22, a word processor 23 and any other application 24, and a meta data editor 25, all operatively coupled.

The CDSA 30 is an existing security layer configuration for providing a widely-accepted set of layered security services defined by Intel Architecture Labs (IAL). Typically, the CDSA is implemented in computer software. Briefly, the functions and operations of the CDSA 30 will be discussed. The CDSA 30 includes a Common Security Services Manager (CSSM) API (application programming interface) that interacts with the applications 22–24 and the editor 25 to allow the applications 22–24 and the editor 25 to access the security-based services offered by the CDSA 30. The CDSA 30 also includes a plurality of service provider modules that offer these security-based services. Among the known service provider modules, the CDSA 30 may include a Cryptographic Service Provider (CSP) module, a Trust Policy (TP) module, a Certificate Library (CL) module, a Data storage Library (DL) module, and an Authorization Computation (AC) module, all known in the art. These modules provide services such as cryptographic operations including bulk encrypting and digital signature processing, accessing remote signing entities such as Certification Authorities (CA), storing certificates and cryptographic keys, etc. In addition, the CDSA 30, as known, includes elective module managers (EMM) that allow new services to be added easily. Under control of the EMM, new services can be added easily in a secure manner by merely providing new service provider modules as plug-ins that implement the new services. The process of adding and integrating the new service modules as plug-ins into the CDSA 30 is known in the art. More detailed operations and functions of the service provider modules and the CSSM API as well as the overall architecture of the CDSA 30 can be found at the website of "developer.intel.com/ial/security/."

Each of the applications 22–24 and the meta data editor 25 is configured to interact with the CDSA 30. In this regard, each of the applications 22–24 and the meta data editor 25 may include a Graphical User Interface (GUI) accelerator 22a, 23a, 24a or 25a for "accelerating" or facilitating the displaying and user-interface operations of the application and the editor. These GUI accelerators 22a–25a are known in the art and, as is well known, may require some hardware to implement the functions. Through the GUI accelerators 22a–25a or any other designated component of the applications 22–24, the applications 22–24 and the editor 25 access the security-based services provided by the CDSA 30. For instance, the GUI accelerator 22a of the Web browser 22 communicates with the CSSM API of the CDSA 30 according to existing techniques to access any one of the security-based services provided by the service provider modules such as CSP module, TP module, etc., whenever it is necessary. For example, if a particular web page received by the Web browser 22 requires decryption, then the Web browser 22 communicates, via the GUI accelerator 22a, with the CSSM API to utilize the decryption service offered by the CSP module of the CDSA 30. Thus, with the help of the CDSA 30, any of the applications 22–24 and the editor 25 in the computing device 10 can carry out data communications with each other and any other communicating component in a secure manner.

The CDSA 30 also verifies each of the GUI accelerators 22a–25a before the GUI accelerators 22a–25a can access the security-based services offered by the CDSA 30. This verification can occur according to existing verification techniques that are used in communication systems to authenticate the validity of communication devices. In this regard, the use of the CDSA 30 further enhances the data security of the device 10.

In accordance with one embodiment, the present invention also provides the data repository plug-in 20 in the user's computing device 10. The data repository plug-in 20 is a plug-in provided as a new service provider module to the CDSA 30, so that it can be easily integrated into the CDSA 30 to interact with the CSSM API of the CDSA 30 under control of the EMM. This configuration allows the data repository plug-in 20 to communicate with any of the applications 22–24 and the meta data editor 25 and to access any meta data being processed by the applications 22–24 and the meta data editor 25 in a secure manner.

Particularly, the data repository plug-in 20 includes a Heuristic access API (HAPI) 14 and one or more database(s) 15, all operatively coupled. The HAPI 14 is capable of accessing any meta data processed in or resulting from the use of the applications 22–24 and the meta data editor 25, storing and organizing the meta data in the database(s) 15 (or any other storage accessible by the device 10), and searching and retrieving most appropriate meta data that can be used in the current context in which the user is using the application 22, 23 or 24.

In the present invention, "meta data" include "application data" and "context data". Application data is any data that is directly used in or by the application, e.g., form data (values entered into the fields of computer forms), user ID and password combinations, PKI certificates/private key pairs, user preference data including bookmarks and display setting data including web page display setting data and file display setting data, etc. Context data is any data that identifies the context in which the application data is used. The context data may include, but are not limited to, field names identifying the fields of forms/files, URLs of forms, file names, roles identifying the role in which the user functions in producing the application data, etc. The display setting data may include, but are not limited to, font, font size, background color, language encoding, window/screen size, whether to open the window/file with a new process or the existing process, security settings, etc.

The HAPI 14 interacts with any application 22–24 and/or the editor 25 that is currently running on the user's device 10 to obtain meta data from the application 22–24 and/or the editor 25 as the user uses the application 22–24 and/or the editor 25. To accomplish this, the HAPI 14 includes a "Remember" interface 16 and a "Retrieval" interface 18, all operatively coupled. The "Remember" interface 16 communicates with a currently active application 22–24 and/or the editor 25 through the CDSA 30, collects meta data through the communications, and stores the meta data in the database(s) 15. For example, if the user has filled out a computer form and sent it to a receiving party by pressing a 'submit' button (this indicates that the Web browser 22 is active), the "Remember" interface 16 obtains form data (i.e., all the values entered by the user into the data fields of this computer form) and stores them in the database(s) 15 as application data. The "Remember" interface 16 also collects and stores context data associated with the form data. The context data may identify the names of the fields of the form, URL of the form, current user role (e.g., as a private citizen, an IBM employee, etc.), and any other property identifying the context of this computer form. In another example, if the user makes modifications to the display setting of the currently displayed web page, new display setting data (e.g., modifications from default setting data or entire new display setting data) will be stored as application data in association with corresponding context data (e.g., URI of the page, current user role, etc.). In still another example, if the currently active application is the word processor 23 and the user sets specific display settings or some other properties for the particular document file that the user is working on, then the "Remember" interface 16 stores in the database(s) 15 these settings or parameters together with corresponding context data which may include the file name, user role, or some other identifier of the file/user.

In one embodiment, the meta data are stored in the database(s) 15 as a plurality of (key, value) pairs. A "key" represents a particular property and a key value represents a value assigned to the property. For instance, a pair "(URL, www.ibm.com)" indicates that a value of "www.ibm.com" is assigned to the property, URL. For each instance wherein the "Remember" interface 16 collects the meta data, it organizes the collected meta data into meta data sets wherein all the data belonging to a single meta data set will be related to each other. Each meta data set comprises a plurality of meta data groups, each group being composed of a plurality of (key, key value) pairs representing application data and context data associated with the application data. This data organization allows the database(s) 15 to be searched based on context data, e.g., a combination of URI, file name, and user role. And with equal importance, this data organization allows related meta data to be stored together, so that relationships between the meta data are considered whenever an access to the stored meta data is desired. A more detailed discussion of this data organization will be provided below in connection with FIGS. 3A and 3B.

In addition to collecting meta data, the "Remember" interface 16 keeps track of the user's use of meta data and stores this information in the database(s) 15. This information, referred to herein as "statistical information", contains statistics representing the past behavior of the user in using the application 22–24 and/or editor 25. It is important to note that this statistical information is updated upon each use of the application 22–24 and/or the editor 25, so that it reflects the user's usage patterns across multiple "remember" invocations by the "Remember" interface 16. This means that the "remembering" or collecting of meta data by the "Remember" interface 16 may need to occur in every use of data, e.g., every time a form is filled or every time a web page is loaded. In one embodiment, the statistical information indicates how frequently certain meta data or a particular combination of (key, value) pairs are used together. For instance, if the user functions as a private person or an employee whenever the user accesses a website A, then the "Remember" interface 16 maintains statistics on the frequency in which each of the role "private" and the role "employee" is used together with the URL of the website A.

The "Retrieval" interface 18 performs search and retrieval operations to utilize the meta data stored in the database(s) 15 to assist the user in using the applications 22–24. When the user activates a particular application 22–24, the "Retrieval" interface 18 interacts continuously with the currently active application 22–24 and determines when it should perform the search and retrieval operations. For instance, when the currently active browser 22 is about to display a form page, then the "Retrieval" interface 18 determines that its search and retrieval operations should be triggered at that instance of using the browser 22. The search operation entails searching the database(s) 15 to provide most appropriate meta data (i.e., application data) that can be used in a particular instance of using the currently active application. The retrieving operation entails retrieving the located meta data from the database(s) 15 and supplying them to the active application 22–24 and/or the editor 25. The search and retrieval operations will now be discussed in more detail.

In a preferred embodiment, the search operation of the "Retrieval" interface 18 is accomplished using existing heuristics algorithms. Heuristics algorithms are well-known computer-implemented methods of iteratively solving problems based on prior usage data. In the present invention, the search operation relies on the stored context data and the statistical information to locate, using iterations, values (application data) that would be most appropriate for use in a current context. For instance, just before the browser is about to display a particular online form to be filled by the user, the "Retrieval" interface 18 searches for likely field values for the form based on the stored context data and the statistical information. To accomplish this, the "Retrieval" interface 18 evaluates data pertaining to the online form as transmitted by the form sender to determine the current context of the form (e.g., field names of the form, URI of the form, form name, etc.). Then the "Retrieval" interface 18 compares iteratively the user's past behaviors (i.e., stored context data and statistical information) in filling out the same or similar form with the context of the current online form to locate values (application data) that the user would most likely enter into the fields of the current online form. The current context of the form is identified by different properties describing the current context, and such context properties may be assigned to different weights to indicate which properties should be given more weight during the search process.

Once the appropriate application data are found, then in the retrieval operation, the "Retrieval" interface 18 retrieves the application data from the database(s) 15 and supplies them to the appropriate application through the CDSA 30. The application then applies the received application data in the current context in which the application is used. In the above example, the browser 22 receives the appropriate application data (field values) from the "Remember" interface 18 and automatically fills in the fields of the current form with the retrieved data field values. If multiple field values are found for each field of the form, then the multiple values may be displayed for the user's selection, e.g., in a drop-down list.

In one embodiment, the "Retrieval" interface 18 implements the high-level searches to encompass different variations of identified search requirements according to known search techniques and rules. For instance, there exist a variety of different search rules that can be applied to perform searches and the "Retrieval" interface 18 is configured to apply these search rules appropriately or according to certain criteria to improve the search process. Examples of such search rules may include, but are not limited to, "Case Independent Rule" for disregarding the case (upper case or lower case) of search terms and data being searched, "Sounds-Like Rule" for automatically including terms that sound like the search terms but are spelled differently, "URL Match Rule_for considering any URL having at least a portion of the search term, or any URL having a portion that matches the search term, etc. The "Retrieval" interface 18 can be configured so that certain search rules can be selectively applied to certain situations.

Overall, the "Retrieval interface" 18 searches and retrieves certain stored application data suitable for use in the current context of using the applications 22–24 to enhance the experience of the user in using the applications 22–24, whether it be browsing the Web, performing word-processing tasks, filling out computer forms, performing online transactions, or any other computer-based activities that can benefit from automation and customization by the device 10.

The meta data editor 25 allows the user to edit, sort, and organize the meta data stored in the database(s) 15 and to set certain criteria, if desired, by which the HAPI 14 operates its meta data storage, search and retrieval operations. The meta data editor 25 can also be used to request certain information from the user, such as the current role of the user. The meta data editor 25 preferably includes a Graphical User Interface (GUI) for communicating with the user and with the applications 22–24. One example of such a meta data editor GUI is found in a co-pending U.S. application Ser. No. 09/862,271, filed on May 22, 2001, assigned to the assignee of the present invention, and entitled "Data Cylinder for Managing Ad-hoc Data Sets", which is herein fully incorporated by reference. The GUI disclosed in U.S. application Ser. No. 09/862,271 displays a cylindrically shaped graphical tool on a user's display device and allows sorting of different sets of meta data based on different roles or other criteria which can be set by the user.

New entries to the database(s) 15 can be created and organized in many different ways. For instance, using the meta data editor 25, the user can manually enter new meta data into the database(s) 15, e.g., using the data cylinder GUI discussed in the above-described co-pending application. In a different way, if the user enters data into a computer form on a web page, the data associated with that web page and the form are automatically collected by the "Remember" interface 16 and stored in the database(s) 15 as discussed above. Before saving a new entry, the system can be configured to ask the user if the user desires to add certain meta data automatically in the database 15. For example, a pop-up window, GUI or some other means can display a question such as this:

ADD Address of "23 Main Street, Durham, N.C. 12345" in association with "Personal Role" and the web page of "www.ibm.com/shopping/thinkpad/my order.html?

The pop-up window or some other means could also list other addresses that are associated with this address field and invite the user to select from the list. These inquiries provide the user with an opportunity to enter and/or edit the meta data (if needed), not have it stored, or to indicate that it should be stored in some other manner, e.g., higher in the hierarchy or in association with a different site such as "www.ibm.com". The user can also select the level of prompting desired, such as always, never, or prompt me when there is a matching field higher in the hierarchy.

In the present invention, communication between the HAPI 14 and the currently active applications 22–24 and/or the editor 25 occurs in a secure manner because the CDSA 30 verifies the validity of the applications 22–24 and transmission using known verification techniques. The use of the CDSA configuration also permits the meta data to be stored in and accessed from the database(s) 15 in a secure manner, well protected from unauthorized users, e.g., hackers. Further, the use of the CDSA is advantageous because the CDSA provides the security services discussed above and, at the same time, allows additional services provided by the HAPI 14 to be added easily as a plug-in to the CDSA. The overall architecture of the CDSA need not be changed to add such new services. Although the use of the CDSA is preferred, the present invention is not limited to such, and can be used in conjunction with other type of security architecture known in the art.

One skilled in the art would appreciate that the user's computing device 10 can include any software and/or hardware components typically found in conventional computing devices such as processors, user input devices (e.g., keyboard, keypad, mouse, optical pen, etc.), user input device adapters, a display device, a display device adaptor, a network interface (e.g., modem, etc.), operating systems, etc. The Web browser 22 is any browser application known in the art, such as Microsoft Internet Explorer, Netscape Navigator, etc. The word processor application 23 is any word processor application known in the art, e.g., MS Word, Corel's WordPerfect, etc. The other application(s) 24 can be any other applications known in the art, such as spreadsheets, photo editors, finance programs, graphics programs, etc.

Figures 3A, 3B:
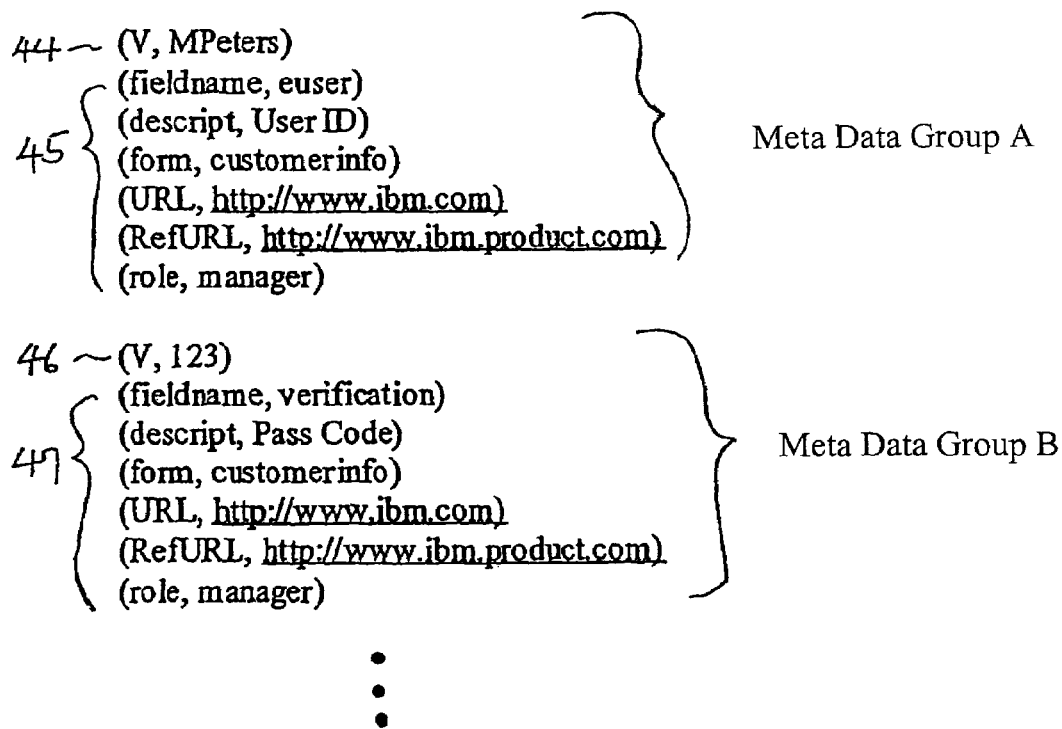
FIG. 3A is a diagram of an example of a computer form usable in the present invention.
FIG. 3B shows an example of (key, value) pairs collectable from the computer form of FIG. 3A according to one embodiment of the present invention.

Now, one example of a meta data organization usable by the "Remember" interface 16 of the HAPI 14 will be discussed in more detail referring to FIGS. 3A and 3B. FIG. 3A shows an example of a computer form usable in the present invention, and FIG. 3B shows examples of (key, value) pairs obtainable from the computer form of FIG. 3A according to one embodiment of the present invention. As shown in FIG. 3A, assume that a computer form 40 to be filled by a user is presented to the user on the device 10. The computer form 40 includes at least two fields 41 and 42, and a "Submit" button 43 for sending the completed form to an appropriate receiving party. The first field 41 is for entering the user ID and the second field 42 is for entering the pass code. The form 40 has the URL of "www.ibm.com."

Given the form 40, the "Remember" interface 16 may collect meta data from the form 40, which are represented as a plurality of (key, value) pairs as shown in FIG. 3B. Particularly, for each of the data fields 41 and 42, a meta data group is established wherein the plurality of meta data groups constitute a meta data set. Each meta data group includes application data (in this case, a field value) and context data associated with that value. For instance, for the user ID field 41, the meta data group A is established. The meta data group A is composed of application data represented by a (key, value) pair 44 and context data represented by (key, value) pairs 45. The (key, value) pair 44 indicates that the value V of the field (key) 41 is "MPeters". The context data 45 indicates the context in which the field value "MPeters" is used. In this case, the context of the field 41 is identified to be as follows: the name of the field 41 is "euser", the description of the field 41 is "User ID", the form 40 having the field 41 is called "customerinfo", the URL of the form 40 is "www.ibm.com," the URL referred in the form 40 is "www.ibm.product.com," and the role of the user (i.e., role in which the user functioned in filling out this form) is "manager". Similarly, the meta data group B established for the field 42 includes a (key, value) pair 46 indicating that the field value V is "123", and context data 47 indicating the context of the field 42. The meta data groups A, B, . . . , are related to each other and constitute a meta data set wherein all the data belonging to the meta data set are related to each other. In this example, the user's role can be collected by requesting the user to specify the user's current role, e.g., using a pop-up window, the meta data editor 25 or some other means, or can be determined using other available meta data, e.g., by comparing the meta data with similar meta data stored in the database(s) 15. This approach is applicable to all embodiments discussed herein.

If the "Retrieval" interface 18 needs to perform a search and retrieval operation to fill out a new computer form that is identical to the computer form 40 shown in FIG. 3A or is in a similar context, then the "Retrieval" interface 18 may search the database(s) 15 based on the following exemplary search requirements:

Retrieve best 5 V Context (50%role=manager, 25%URL="www.ibm.com," 10%descript=User ID, 5%fieldname=euser, 10%RefURL="www.ibm.product.com");

Retrieve best 5 V Context (50%role=manager, 25%URL="www.ibm.com," 10%rescript=Pass Code, 5%fieldname=verification, 10%RefURL="www.ibm.product.com");

Here, "V" stands for a value. These search criteria are formulated based on the form information for the form 40, which the "Retrieval" interface 18 would have obtained from the browser 22 before the form 40 is displayed. The search criteria essentially represent the current context of filling in the new form with different weights (%) given to different context properties such as role, URL, descript, etc. This results in a search based on the weighted context corresponding to the current context of the new form. The weights assigned to the different context properties may be determined in advance and modified (if needed) by the system to find optimal solution(s), and they may differ depending on which application 22–24 is being used in what context. In this example, the role of the user is assigned to 50% of the weight, indicating that the role is important (importance represented by weights) and should be given certain weight (50%) during the search process.

The "Retrieval" interface 18 executes the search in the database 15 by executing the heuristics algorithms to find optimal solution(s) that would satisfy these search requirements in an optimal manner. The statistical information is used in this process to find most appropriate (optimal) solutions. The optimal solutions(s) would be certain application data (e.g., likely values for the fields of the new form), stored in the database(s) 15, that would be most appropriate for the current context of filling in the new form. In this manner, the meta data organization of the present invention permits data to be searched by URLs, user role and/or other context data.

Figure 4:
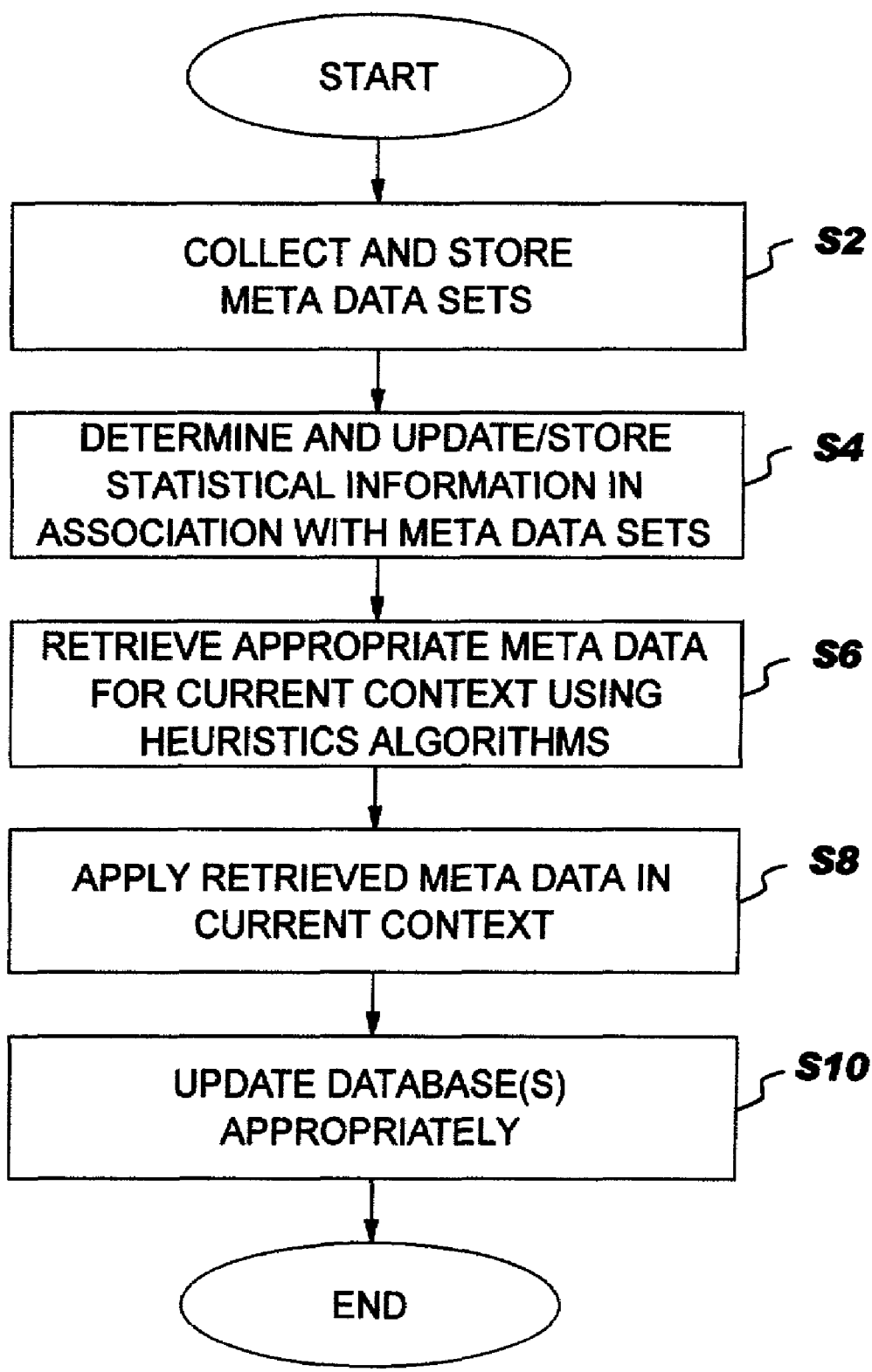
FIG. 4 is a flowchart illustrating the processing steps of a method for managing meta data according to one simple embodiment of the present invention.

FIG. 4 is a flowchart illustrating the processing steps of a method for managing meta data according to a simple embodiment of the present invention. The processing steps can be implemented in the user's computing device 10 of FIG. 2. As shown in FIG. 4, in Step S2, as the user utilizes one or more applications 22–24 and/or the editor 25, meta data sets including application data and context data are collected at appropriate different instances of using the applications 22–24 and/or the editor 25, and are stored in the database(s) 15. The collection of the meta data sets is made by the "Remember" interface 16 of the HAPI 14 in the user's computing device 10 as it interacts with the applications 22–24 and/or the editor 25 as discussed above.

In Step S4, statistical information indicating frequency in which certain application data are used together in the meta data sets, is determined and stored/updated in the database(s) 15 in association with the meta data sets. In Step S6, at certain instances of using the applications 22–24, appropriate meta data (i.e., application data) are retrieved from the database(s) 15 by the "Retrieval" interface 18 based on the context data and the statistical information. This can be accomplished using existing heuristic algorithms to generate search requirements based on the current context of using the application 22–24 and to search the database(s) for application data that satisfy the search requirements. The user role for the current context may be determined by the system based on available data stored in the database, or by requesting it from the user, e.g., using a pop-up window or the GUI of the meta data editor 25.

In Step S8, the retrieved application data are applied appropriately in the current context of using the application 22, 23 or 24, for example, for displaying a web page, filling in a computer form, etc. Then, in Step S10, the database(s) 15 are updated appropriately to store any user's modification in the current context and/or to update context data and statistical information in view of the current use of the application data.

Figure 5:
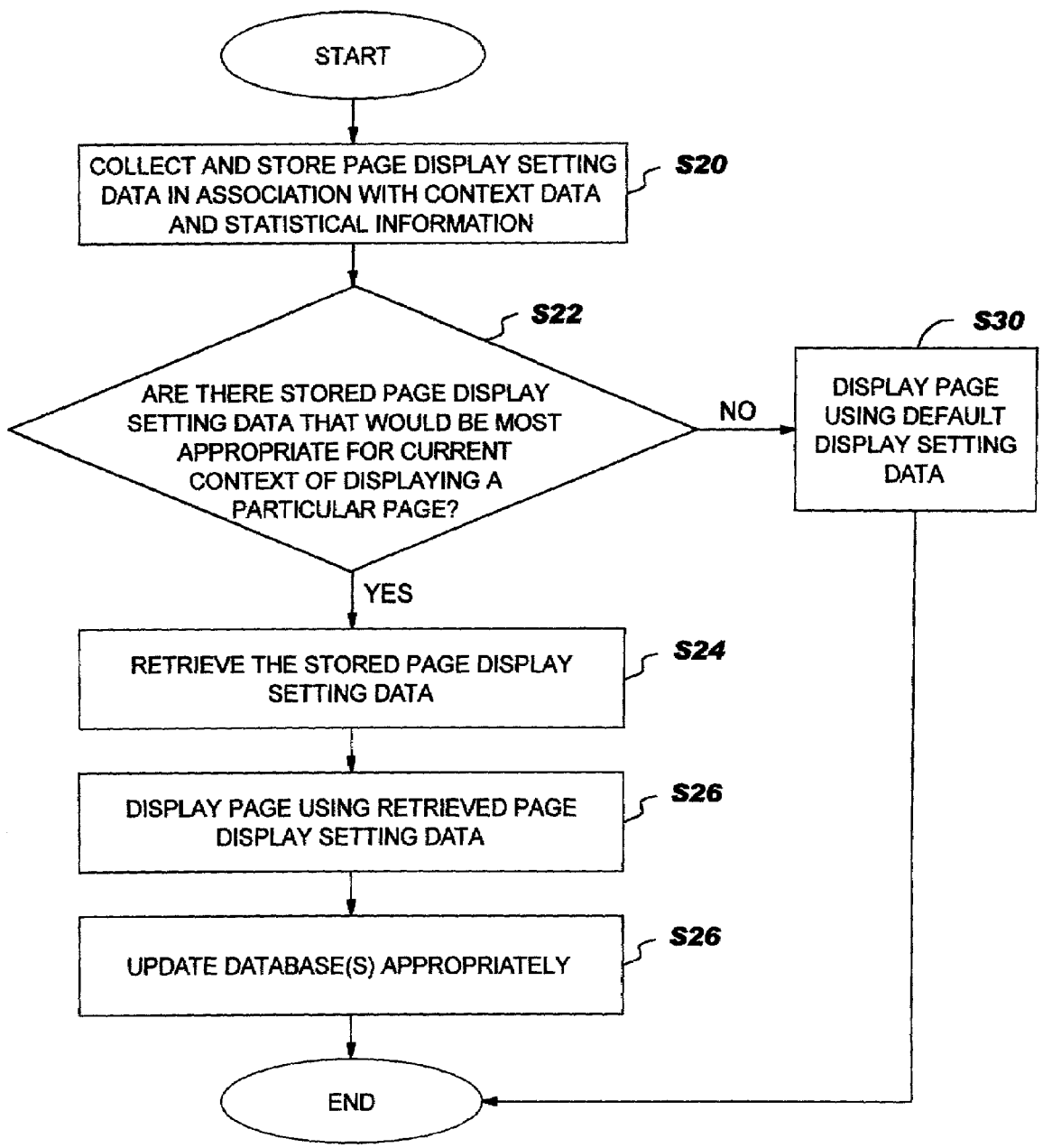
FIG. 5 is a flowchart illustrating the processing steps of a method for managing meta data in the context of displaying web pages according to one embodiment of the present invention.
Figure 6:
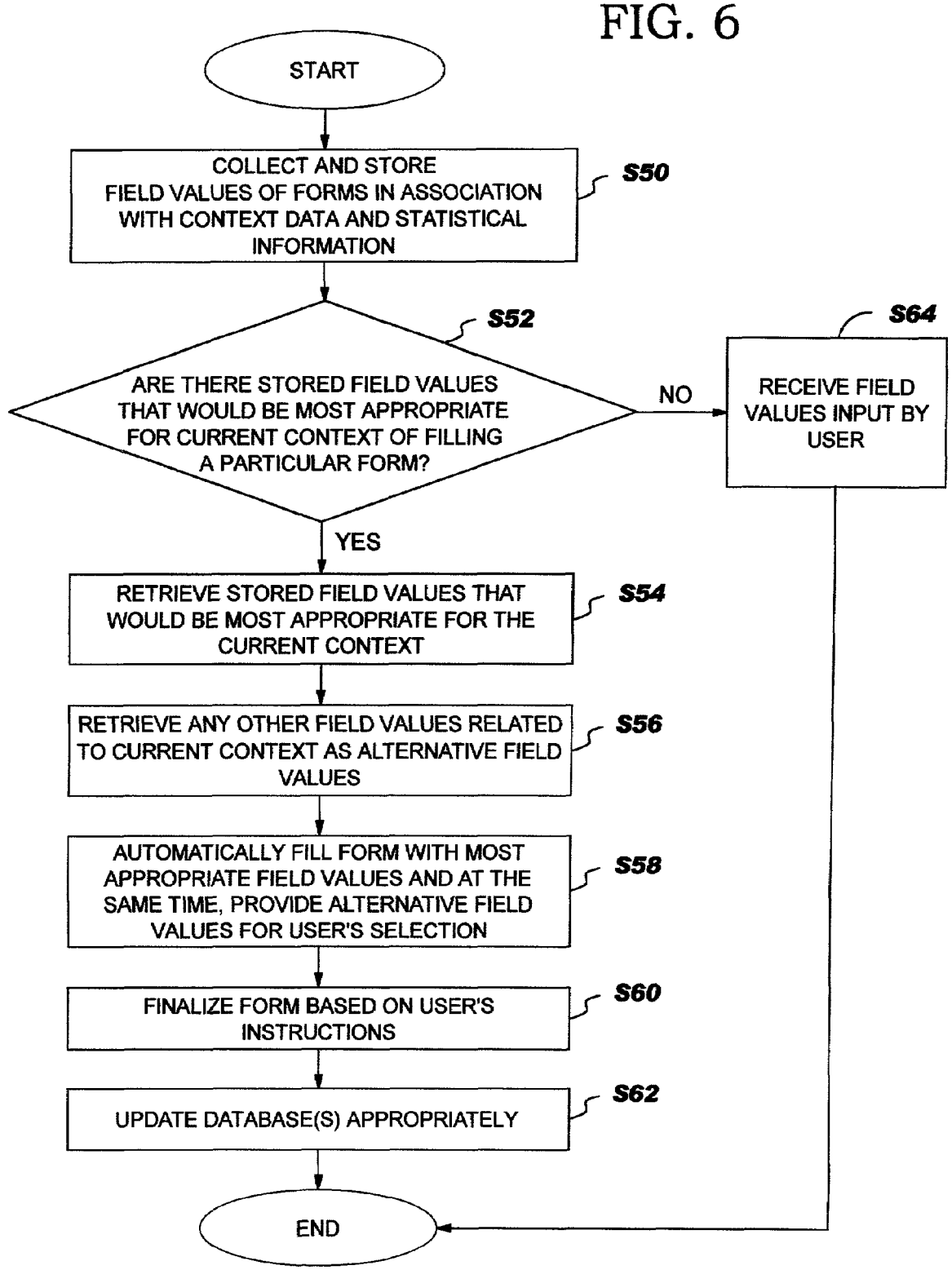
FIG. 6 is a flowchart illustrating the processing steps for managing meta data in the context of filling in forms according to one embodiment of the present invention.
Figure 7:
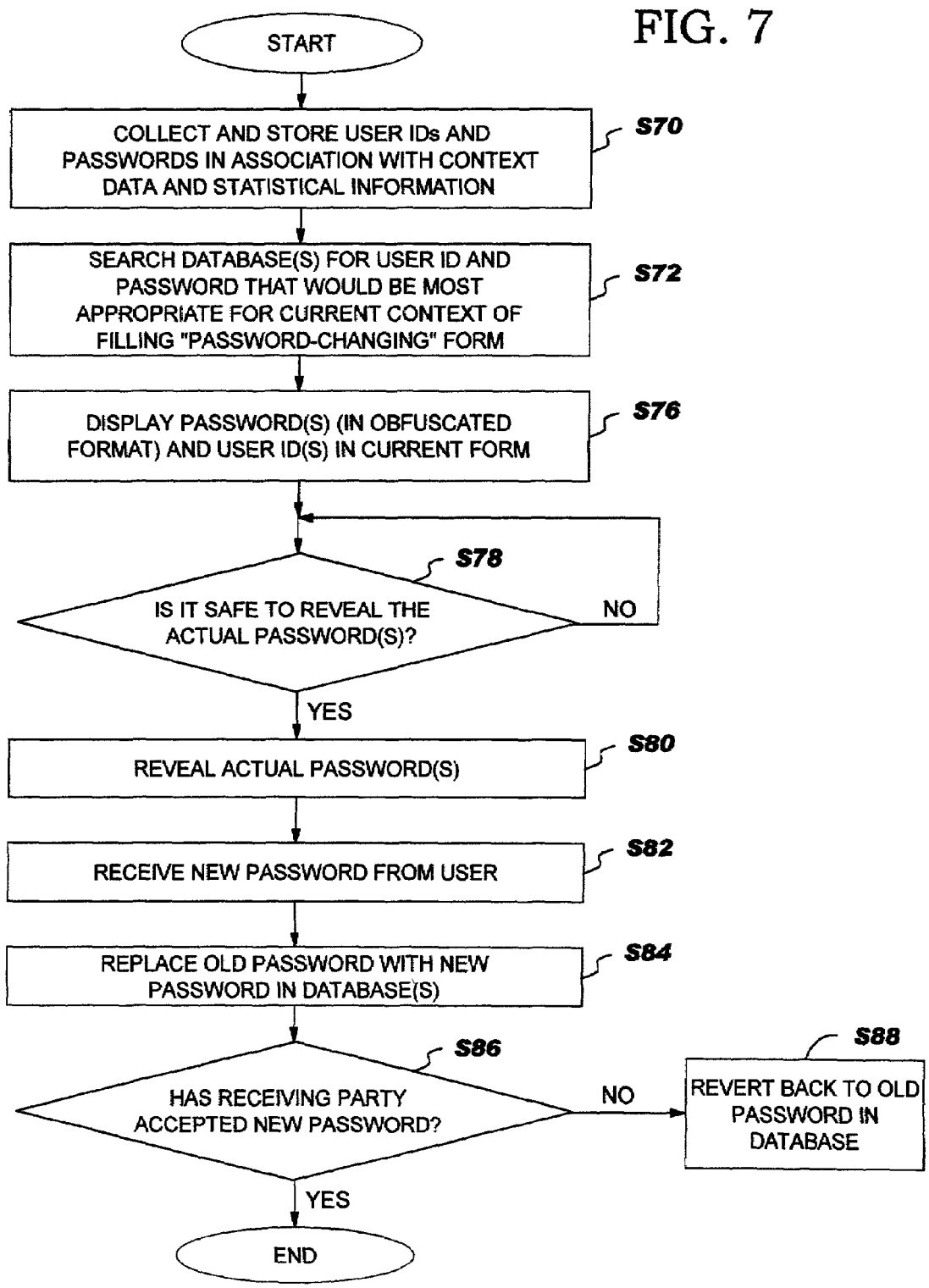
FIG. 7 is a flowchart illustrating the processing steps for managing meta data in the context of changing passwords according to one embodiment of the present invention.

FIGS. 5–7 illustrate flowcharts illustrating the processing steps of a method for managing meta data in different contexts according to different embodiments of the present invention. All these processing steps can be implemented in the user's computing device 10 of FIG. 2.

Specifically, FIG. 5 illustrates an application of the method of FIG. 4 in the context of displaying web pages. As the user browses through different web pages, the user may prefer these web pages to be displayed in different page settings depending on the context of the page (i.e., URI of the page, role of the user, etc). For instance, the user may prefer to view a particular page in a larger font size than other pages, or to view all pages in the same predetermined settings when the user functions in a particular role, e.g., as an IBM employee.

In Step 20 of FIG. 5, as the user modifies the display settings of web pages from the default or predetermined settings, such page display setting data are collected and stored in the database(s) 15 in association with context data and statistical information as discussed above. The page display setting data and the context data will be represented as (key, value) pairs, whereas the statistical information may be represented numerically. The context data may identify the URI of the page, user role for that page, etc.

In Step S22, when a particular web page needs to be displayed to the user (e.g., in response to the user's request), it is determined if there are any stored page display setting data that would be most appropriate for the current context of displaying the particular web page. This determination can be made by performing the search operation of the "Retrieval" interface 18 based on the current context of the particular web page as discussed above. For instance, the "Retrieval" interface 18 may search the database(s) to locate display setting data (application data) associated with context data that approximately matches the current context of the particular web page according to certain search requirements. If multiple application data sets are found, which is likely, the statistical information is relied upon to select an application data set from the multiple application data sets that is most frequently used by the user in a context most closely representing the current context.

If the determination result at Step S22 is "yes", then the most appropriate page display setting data are retrieved from the database(s) 15 by the "Retrieval" interface 18 in Step S24. Then, in Step S26, the retrieved page display setting data are applied during the displaying process to display the current web page according to the retrieved data. To accomplish this, the "Retrieval" interface 18 sends the retrieved page display setting data to the Web browser 22 through the CDSA 30 and the browser 22 displays the current page using the retrieval display setting data.

In Step S28, the database(s) 15 are updated appropriately. If the user has modified the page settings of the current web page, the modifications would be stored in the database(s) 15. The context and statistical information will also be updated in view of the current use of the application data.

On the other hand, at Step S22, if it is determined that there are no stored page display setting data that would be most appropriate for the current context of displaying the page, then the Web browser 22 at Step S30 is configured to display the currently requested page using default settings or other predetermined settings.

Thereafter, the process returns to Step S28 and the process continues as discussed above.

Accordingly, the present invention displays automatically different web pages according to different display settings that are preferred or likely preferred by the user. This feature enhances the Web browsing experience of the user significantly.

One skilled in the art would readily appreciate that the processing steps of FIG. 5 are not limited to Web page display operations, but are applicable to any output operations. For example, the steps of FIG. 5 are applicable to providing differential settings for the speech synthesis rendering of a web page. In another example, the steps of FIG. 5 are applicable to displaying files (e.g., word processor files, graphics files, etc.), where the context data may identify the names of the files, user roles, etc.

FIG. 6 illustrates another application of the method of FIG. 4 for filling out a computer form according to one embodiment of the present invention. As shown in FIG. 6, in Step S50, as the user enters values into the data fields of different computer forms, these values are collected and stored in the database(s) 15 in association with context data (e.g., URI of the form, field name, user role, etc.) and statistical data as discussed above. In Step S52, when a particular web page containing one or more forms needs to be displayed to the user (e.g., in response to the user's request), then the "Retrieval" interface 18 of the user's computing device 10 determines if there are any stored field values that would be most appropriate for the current context of filling out this particular form. This determination is made based the results of a heuristics search operation performed by the HAPI 14 based on the current context of the particular form as discussed above. If the determination result at Step S52 is "yes", then in Step S54, the located field values are retrieved from the database(s) 15 by the "Retrieval" interface 18. Then in Step S56, the "Retrieval" interface 18 further searches the database(s) 15 and retrieves from the database(s) 15 any other field values (if available) that may be related to the current context of the form, so that they can be used as alternative field values possibly usable to fill the fields of the current form. For example, the statistical information can be used to locate values that would be second-most appropriate for the current context of the form.

Then in Step S58, all the fields of the current form are automatically and simultaneously filled in with the most appropriate field values retrieved in Step S54, e.g., under control of the Web browser 22. At the same time, the alternative field values retrieved in Step S56 may also be displayed to the user for the user's consideration. This can be accomplished under control of the meta data editor 25. For example, for each field on the current form, a drop-down list, a pop-up window or a graphical data cylinder displaying the alternative field values may appear on the user's screen so that the user can select, if desired, one of the alternative field values for the particular field. In this manner, the user can either accept the field values that are automatically filled in, or can select one of the alternative field values for the fields of the form. In addition or as an alternative, the user can manually enter the values into the form or modify the existing values.

In Step S60, if the values displayed in the fields of the form are acceptable to the user, the user can instruct the device 10 to finalize the form by, e.g., selecting a "submit" button or performing any other designated action.

In Step S62, once the form has been finalized, the database(s) are updated appropriately to store all the values entered in the fields of the current form and to update any context data and statistical information, as needed. The values entered for the fields can be values that are automatically filled in by the system, selected by the user from the alternative values, and/or manually entered by the user.

On the other hand, if it is determined at Step S52 that there are no field values that would be most appropriate for the current context of filling in the form, then the process moves to Step S64 wherein the device 10 receives field values manually input by the user, for example, from a keyboard or keypad. Then the process returns to Step S62 wherein the database(s) 15 are updated appropriately. Thereafter, the process ends.

Accordingly, the present invention automatically suggests, using heuristics algorithms, possible values for the data fields of computer forms based on the user's prior form filling acts. As a result, although the field names of the forms may not be identical, more accurate suggestions for the fields can be made. In addition, all the fields of the computer forms can be filled automatically at one time.

In the embodiments discussed in connection with FIG. 6, one skilled in the art would readily appreciate that the automatic filling of the form can occur after the blank form is displayed to the user, or prior to the displaying of the form. In the latter case, the user will not see the blank form, but the filled form will be displayed at once.

FIG. 7 illustrates another application of the method of FIG. 4 in the context of filling in a "password-changing" form. A password-changing form is any known computer form for changing the user's password. As shown in FIG. 7, in Step S70, as the user enters values into the data fields of different forms including password registration forms, the entered passwords and corresponding user IDs are collected and stored in the database(s) 15 in association with context data (e.g., URI of the form, user role, etc.) and statistical information as discussed above. For instance, when the user fills out an "IBM customer registration form" through the Internet, the particular user ID and the password entered by the user into the fields of this form are stored in the database(s) 15 in association with the statistical information and context data. It is also possible for the user to enter the password and/or user ID using only the meta data editor 25, without filling in the conventional computer forms.

Then, in Step S72, when a particular password-changing form is displayed on the display unit of the device 10, then the database(s) 15 are searched by the "Retrieval" interface 18 of the device 10 to locate a user ID/password combination that would be most appropriate for the current context of filling in the particular form. This is accomplished by performing the search and retrieve operations of the "Retrieval" interface 18 using heuristics algorithms as discussed above. The search operation will locate one or more user IDs and passwords that would be most appropriate for the fields of the current form.

Then in Step S76, the located user ID(s) and password(s) are then retrieved from the database(s) 15 and automatically filled into the appropriate fields of the current password-changing form such as the "old ID" and "old password" fields. The user ID(s) are displayed so that the user can see what they are, whereas the password(s) are displayed in obfuscated format (e.g., using strings of asterisks) so that no one can see what the actual password(s) are. In this way, the password(s) can be protected from being used by unauthorized individuals.

Then in Step S78, the user is requested to determine whether it is safe to reveal the actual password(s). This can be accomplished, e.g., using the meta data editor 25, or by providing a pop-up window or prompt requesting the user's approval for revealing the actual password(s). If it is determined based on the user's input that the actual password(s) can be revealed (e.g., because no one is near the user), in Step S80 the actual password(s) are revealed to the user. The displaying of the actual password(s) does not occur until the user informs the device 10 that it is O.K. to display the actual password(s). To increase security, in one embodiment, the user may need to enter a particular code or the like to verify that the user's approval for displaying the actual password(s) is an authorized one. If only one password is displayed, the user reviews it as well as the user ID to verify that they are acceptable. If multiple user IDs and/or passwords are displayed, then the user must select one of the displayed user IDs and one of the displayed passwords for the current form.

In Step S82, the user enters a new password into the "new password" field in the form and the form is submitted (e.g., by pressing a "submit" button) to the form receiving party such as an online vendor server. Then the new password entered by the user is received by the HAPI 14 of the device 10. In Step S84, the old password stored in the database(s) 15 in connection with the current context data (e.g., user ID, URI and/or role) is then replaced with the newly received password. In addition, the context data and statistical information may be updated in view of the current use of the form.

In Step S86, if it is determined that the receiving party approves or accepts the new password (e.g., based on the review of a response from the receiving party), the process ends and the password changing process is completed successfully. However, if the receiving server does not accept the new password at Step S86, then the old password, instead of the new password, is stored back in the database(s) and the context and statistical information is updated appropriately. Then the process ends.

In another embodiment, in Steps S84–S88, the device 10 is configured so that the replacing of the old password with the new password does not occur until the receiving party accepts the new password. This eliminates the need to revert back to storing the old password in the database(s) if the receiving party rejects the new password.

It should be noted that the processes of FIGS. 5–7 can be implemented together or simultaneously, if appropriate. For instance, when a form page is to be displayed, the form page can be displayed according to the steps of FIG. 5 and be filled with field values according to the steps of FIG. 6.

Although the present invention has been discussed herein in connection with displaying or visually providing certain information to a user, e.g., in FIGS. 5 and 7, the present invention is not limited to such, but is equally applicable to customizing and/or personalizing information to be rendered to a user in any manner, not just visually.

In one embodiment, if the URI is used as a context property to search the database(s) 15, the entire URI string is searched first. If no matches are found, then the beginning portions or other predetermined portions of the URI may be searched. For example, if the URI of "www.ibm.com/shopping/Thinkpad/my_order.html" is searched and no hits are found for this URI, then the system may be configured to look for an entry that matches just "www.ibm.com/shopping" or "www.ibm.com."

In another embodiment, each field value that is suggested to the user is visibly identified for the user so that the user knows the identity of the field to which it pertains. For example, suggested address values for the "address" field might be identified to the user as follows:

ADDRESS (PERSONAL ROLE): 1000 J. Hind Street, Durham, N.C. 12345

ADDRESS (IBM EMPLOYEE ROLE): P.O. Box 12195, Research Triangle Park, N.C. 23232

By labeling the suggested values appropriately, the user is able to quickly recognize these values for what they are, and the user's selection process can be facilitated significantly.

In still another embodiment, the meta data can be stored in the database(s) 15 in encrypted form, and can only be accessed if the user supplies proper credentials such as a user ID and password, biometric identification, or an X509 certificate and private key. This can be implemented using the security functions provided by the CDSA 30, or by adding an encryption plug-in as a new service provider module to the CDSA 30 or other equivalent security architecture implementation.

It should be clearly understood that the process of selecting most appropriate meta data that would be suitable for the current context of using the application based on the past behavior of the user, according to the present invention, is applicable to any application or situation where meta data is requested. For example, in some applications, a particular website that the user is interacting with may employ well-established Secured Sockets Layer (SSL) encryption techniques. The SSL techniques allow the website to perform an SSL handshake with the user's browser so that secured data can be transmitted between the user's device and the website server. Conventional browsers utilize a predetermined client side certificate/public-private key pair to perform the SSL handshake with the user's device, and, sometimes, this certificate/public-key is passed to the website server as a verification of the user_s identity. However, according to the present invention, before performing an SSL handshake, the Web browser 22 is configured to communicate with the HAPI 14 which in turn selects a certificate/public-key from the database(s) 15 which is associated with the current context of selecting a certificate/public-key (e.g., user role and/or the URI that the browser is in the process of loading). If the search results by the HAPI 14 indicate that there are multiple certificates/public-keys that satisfy this criterion, then the system is configured to display to the user these certificates/public-keys by name in a pop-up window, a pull-down list, or some other manner, along with their associated context data (e.g., user role, URI), etc. One of the certificates/public-keys that is most likely to match the current situation of the user may be highlighted or distinguished from other certificates/public-keys in some manner. The user can then view the certificates/public-keys, accept or reject the certificate/public-key (if there is only one), or select one certificate/public-key (if there are multiple) to be used for the SSL handshake. The user is also able to set criteria by which the system operates in connection with the certificate/public-key selection. For instance, the user can indicate to the system whether a default certificate/public-key should be selected based on the role without further consultation with the user, or whether the user prefers to always be prompted when a default certificate/public-key has to be used.

In another example, when a server requests a cookie from the browser 22, the HAPI 14 can be configured to retrieve the user's cookie based on the current role of the user (e.g., as an individual) and as a result, the browser will return the user's cookie that is appropriate for the current context.

The database(s) 15 are organized hierarchically using any prior art database management techniques, but may be sorted according to different criteria. As discussed above, the meta data stored in the database(s) 15 are stored, preferably, in (key, value) pairs, and may be encoded, e.g., using known XML encoding or other encoding techniques. Certain keys in the (key, value) pairs may be predefined by the system, or created dynamically by the system and/or user.

Accordingly, the present invention provides a system and method which studies the history of the user's past behaviors in using different applications and data editors and which provides intelligent recommendations and functions that would improve greatly the user's current experience of using the applications, whether it be for web browsing, data processing, communicating with other users, executing application programs, etc.

The processing steps of the present invention can be implemented by computer programs in conjunction with hardware components if needed. Software programming code which embodies the present invention may be stored on any of a variety of known media such as a diskette, hard drive, CD-ROM, or read-only memory, and may be distributed on such media. The techniques and methods for embodying software programming code on physical media and/or distributing software code are known in the art.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method of managing meta data in a computing device, the method comprising:
    collecting meta data resulting from use of the computing device, the meta data comprising application data that is used in or by applications associated with the computing device and context data for identifying the context in which the application data are used;
    determining statistical information associated with the user's past behavior in using the meta data, the statistical information indicating relationships between the meta data;
    storing the meta data and the statistical information in a storage of the computing device; and
    retrieving, from the storage, application data that would be most appropriate for a current context of using a select application by anticipating a likely behavior of the user during the current use based on the context data and the statistical information.

2. The method of claim 1, further comprising:
    applying the retrieved application data in the current context.

3. The method of claim 1, wherein the context data identify at least one of the following: user roles, uniform resource identifiers (URIs), file names, and/or form names pertaining to the application data.

4. The method of claim 1, wherein the application data comprise at least one of the following: page display setting data, file display setting data, user ID/password combinations, user's preference data, bookmarks, and authentication data.

5. The method of claim 4, wherein the authentication data comprise at least one of the following: certificates, or public keys.

6. The method of claim 1, wherein the meta data are stored in (key, value) pairs.

7. The method of claim 1, wherein the statistical information indicates frequencies in which particular application data are used together in particular contexts.

8. The method of claim 1, wherein the computing device implements a Common Data Security Architecture (CDSA), and-retrieving, from the storage, application data that would be most appropriate for a current context of using the application based on the context data and the statistical information is performed by a CDSA add-on module.

9. The method of claim 1, wherein the current context comprises at least one of the following: opening a web page, filling in a computer form, filling in a password-changing form, providing a certificate, opening a computer file, processing a computer file, or executing an application program.

10. The method of claim 1, further comprising:
providing a graphical user interface (GUI) for allowing the user to organize the stored meta data.

11. The method of claim 10, wherein the GUI displays a graphical tool in a cylindrical configuration for organizing the stored meta data.

12. The method of claim 1, wherein retrieving, from the storage, application data that would be most appropriate for a current context of using the application based on the context data and the statistical information is performed using heuristics algorithms.

13. The method of claim 1, wherein retrieving, from the storage, application data that would be most appropriate for a current context of using the application based on the context data and the statistical information comprises:
formulating search requirements based on the current context of using the application; and
executing a search based on the search requirements.

14. The method of claim 13, wherein the search requirements specify weighted properties of the current context of using the application.

15. The method of claim 14, further comprising:
applying the retrieved application data in the current context; and
applying predetermined application data in the current context if no such most appropriate application data are retrieved in the retrieving step.

16. The method of claim 1, wherein the current context is for filling in a computer form, and the method comprises:
automatically filling in the computer form with said most appropriate application data.

17. The method of claim 16, further comprising:
retrieving, from the storage, alternative application data that are related to the current context of filling in the computer form; and
presenting the alternative application data to a user for the user's consideration.

18. The method of claim 16, wherein the computer form is a password-changing form, and the retrieved application data-comprise a user identification and a password.

19. The method of claim 18, wherein automatically filling in the computer form with said most appropriate application data comprises:
presenting the password in the form in an obfuscated format;
determining whether presenting the actual password to a user is safe; and
presenting the actual password in a non-obfuscated format when it is determined to be safe to present the actual password.

20. The method of claim 19, wherein determining whether presenting the actual password to the user is safe is performed based on input from the user.

21. The method of claim 19, further comprising:
replacing the password stored in the storage with a new password if the new password has been accepted by a receiving party.

22. The method of claim 1, wherein:
said collecting meta data resulting from use of the computing device further comprises verifying that each source is authorized to collect or provide the meta data; and
said retrieving, from the storage, application data that would be most appropriate for a current context of using a select application by anticipating a likely behavior of the user during the current use based on the context data and the statistical information further comprises verifying the select application is authorized to receive meta data before retrieving and providing the appropriate application data to the select application.

23. The method of claim 1, wherein:
said collecting meta data resulting from use of the computing device comprises collecting meta data from at least a first application and a second application; and
said retrieving, from the storage, application data that would be most appropriate for a current context of using a select application by anticipating a likely behavior of the user during the current use based on the context data and the statistical information further comprises retrieving the appropriate application data for the first application based upon context information derived from the second application.

24. The method of claim 1, wherein:
said retrieving, from the storage, application data that would be most appropriate for a current context of using a select application by anticipating a likely behavior of the user during the current use based on the context data and the statistical information comprises anticipating a role of the user and retrieving from storage, application data that is most appropriate for that role.

25. A computer program product for managing meta data in a computing device, the computer program product comprising a computer readable storage medium having computer readable program code embodied in said medium, said computer-readable program code comprising:
computer readable program code configured to collect meta data resulting from use of the computing device, the meta data comprising application data that is used in or by applications associated with the computing device and context data for identifying the context in which the application data are used;
computer readable program code configured to determine statistical information associated with the user's past behavior in using the meta data, the statistical information indicating relationships between the meta data;
computer readable program code configured to store the meta data and the statistical information in a storage of the computing device; and
computer readable program code configured to retrieve, from the storage, application data that would be most appropriate for a current context of using a select application by anticipating a likely behavior of the user during the current use based on the context data and the statistical information.

26. The computer program product of claim 25, further comprising:
computer readable program code configured to apply the retrieved application data in the current context.

27. The computer program product of claim 25, wherein the context data identify at least one of the following: user roles, uniform resource identifiers (URIs), file names, and/or form names pertaining to the application data.

28. The computer program product of claim 25, wherein the application data comprise at least one of the following: page display setting data, file display setting data, user ID/password combinations, user's preference data, bookmarks, and authentication data.

29. The computer program product of claim 28, wherein the authentication data comprise at least one of the following: certificates, or public keys.

30. The computer program product of claim 25, wherein the meta data are stored in (key, value) pairs.

31. The computer program product of claim 25, wherein the statistical information indicates frequencies in which particular application data are used together in particular contexts.

32. The computer program product of claim 25, wherein the computing device implements a Common Data Security Architecture (CDSA), and the computer program product is implemented as a CDSA add-on module.

33. The computer program product of claim 25, further comprising:
computer readable program code configured to update the computing device with meta data resulting from use of the computing device in the current context.

34. The computer program product of claim 25, wherein the current context comprises at least one of the following: opening a web page, filling in a computer form, filling in a password-changing form, providing a certificate, opening a computer file, processing a computer file, or executing an application program.

35. The computer program product of claim 25, further comprising:
computer readable program code configured to provide a graphical user interlace (GUI) for allowing the user to organize the stored meta data.

36. The computer program product of claim 35, wherein the GUI displays a graphical tool in a cylindrical configuration for organizing the stored meta data.

37. The computer program product of claim 25, wherein the computer readable program code configured to retrieve the most appropriate meta data is implemented using heuristics algorithms.

38. The computer program product of claim 25, wherein the computer readable program code configured to retrieve the most appropriate meta data comprises:
computer readable program code configured to formulate search requirements based on the current context of using the application; and
computer readable program code configured to execute a search based on the search requirements.

39. The computer program product of claim 38, wherein the search requirements specify weighted properties of the current context of using the application.

40. The computer program product of claim 39, further comprising:
computer readable program code configured to apply the retrieved application data in the current context; and
computer readable program code configured to apply predetermined application data in the current context if no such most appropriate application data arc retrieved.

41. The computer program product of claim 25, wherein the current context is for filling in a computer form, and the computer program product comprises:
computer readable program code configured to automatically fill in the computer form with said most appropriate application data.

42. The computer program product of claim 41, further comprising:
computer readable program code configured to retrieve, from the storage, alternative application data that are related to the current context of filling in the computer form; and
computer readable program code configured to present the alternative application data to a user for the user's consideration.

43. The computer program product of claim 41, wherein the computer form is a password-changing form, and the retrieved application data comprise a user identification and a password.

44. The computer program product of claim 43, wherein computer readable program code configured to fill in the computer form comprises:
computer readable program code configured to present the password in the form in an obfuscated format;
computer readable program code configured to determine whether presenting the actual password to a user is safe; and
computer readable program code configured to present the actual password in a non-obfuscated format when it is determined to be safe to present the actual password.

45. The computer program product of claim 44, wherein the computer executable instructions for determining whether presenting the actual password to a user is safe is executed based on input from the user.

46. The computer program product of claim 44, further comprising:
computer readable program code configured to replace the password stored in the storage with a new password if the new password has been accepted by a receiving party.

47. The computer program product of claim 25, wherein:
said computer readable program code configured to collect meta data resulting from use of the computing device, the meta data comprising application data that is used in or by applications associated with the computing device and context data for identifying the context in which the application data are used further comprises computer readable program code configured to verify that each source is authorized to collect or provide the meta data; and
said computer readable program code configured to retrieve, from the storage, application data that would be most appropriate for a current context of using a select application by anticipating a likely behavior of the user during the current use based on the context data and the statistical information further comprises computer readable program code configured to verify the select application is authorized to receive meta data before retrieving and providing the appropriate application data to the select application.

48. The computer program product of claim 25, wherein:
said computer readable program code configured to collect meta data resulting from use of the computing device comprises computer readable program code configured to collect meta data from at least a first application and a second application; and
said computer readable program code configured to retrieve, from the storage, application data that would be most appropriate for a current context of using a select application by anticipating a likely behavior of the user during the current use based on the context data and the statistical information further comprises computer readable program code configured to retrieve the appropriate application data for the first application based upon context information derived from the second application.

49. The computer program product of claim 25, wherein:
said computer readable program code configured to retrieve, from the storage, application data that would be most appropriate for a current context of using a select application by anticipating a Likely behavior of the user during the current use based on the context data and the statistical information comprises computer readable program code configured to anticipate a role of the user and retrieving from storage, application data that is most appropriate for that role.

50. A system for managing meta data in a secure manner, the system comprising:
 a computing device capable of communicating with other communication devices through a communications network, the computing device comprising,
 a plurality of applications selectably executable on the computing device, a security architecture for selectively providing security-based services to at least one of the plurality of applications,
 a data repository module, provided as an add-in module to the security architecture, for collecting meta data resulting from use of the computing device, the meta data comprising application data that is used in or by applications associated with the computing device and context data for identifying the context in which the application data are used, determining statistical information associated with the user's past behavior in using the mete data, the statistical information indicating relationships between the meta data, storing the meta data and the statistical information in a storage of the computing device, and retrieving, from the storage, application data that would be most appropriate for a current context of using a select application by anticipating a likely behavior of the user during the current use based on the context data and the statistical information.

51. The system of claim 50, wherein the data repository module comprises:
 the storage for storing the meta data;
 a first interlace for managing a process of storing the meta data in the storage; and
 a second interlace for retrieving from the storage said most appropriate meta data for the current context.

52. The system of claim 51, wherein the second interface formulates search requirements based on the current context of using the application, and executes a search based on the search requirements to retrieve said most appropriate meta data.

53. The system of claim 52, wherein the search requirements specify weighted properties of the current context of using the application.

54. The system of claim 50, wherein the context data comprise at least one of the following: user roles, uniform resource identifiers (URIs), file names, or form names pertaining to the meta data.

55. The system of claim 50, wherein the meta data are stored in (key, value) pairs.

56. The system of claim 50, wherein the security architecture is Common Data Security Architecture (CDSA).

57. The system of claim 50, wherein the meta data represent at least one of the following: web page settings, file display settings, user ID/password combinations, computer form data, user's preferences, book marks, and authentication data.

58. The system of claim 57, wherein the authentication data comprise at least one of the following: certificates, or public keys.

59. The system of claim 50, wherein the current context comprises at least one of the following:
 opening a web page, filling in a computer form, filling in a password-changing form, providing a certificate, opening a computer file, processing a computer file, or executing an application program.

60. The system of claim 50, further comprising:
 a meta data editor for for providing a graphical user interlace (GUI) that allows the user to organize the stored meta data.

61. The system of claim 60, wherein the GUI is a graphical tool in a cylindrical configuration.

62. The system of claim 50, wherein:
 the security architecture verifies that each source is authorized to collect or provide the meta data and verifies the select application is authorized to receive meta data before retrieving and providing the appropriate application data to the select application.

63. The system of claim 50, wherein:
 the data repository module collects meta data from at least a first application and a second application and retrieves the appropriate application data for the first application based upon context information derived from the second application.

64. The system of claim 50, wherein:
 the data repository module anticipates a role of the user and retrieves from storage, application data that is most appropriate for that role.

* * * * *